United States Patent [19]
Kai et al.

[11] Patent Number: 5,241,654
[45] Date of Patent: Aug. 31, 1993

[54] APPARATUS FOR GENERATING AN ARBITRARY PARAMETER CURVE REPRESENTED AS AN N-TH ORDER BEZIER CURVE

[75] Inventors: Naoyuki Kai, Tokyo; Masahide Ohhashi; Ichiro Nagashima, both of Yokohama, all of Japan

[73] Assignee: Kabushiki Kaisha Toshiba, Kawasaki, Japan

[21] Appl. No.: 917,685

[22] Filed: Jul. 22, 1992

Related U.S. Application Data

[63] Continuation of Ser. No. 456,874, Dec. 26, 1989, abandoned.

[30] Foreign Application Priority Data

Dec. 28, 1988 [JP] Japan ............................. 63-328920

[51] Int. Cl.5 .............................................. G06F 15/62
[52] U.S. Cl. .................................................. 395/142
[58] Field of Search ............... 364/518, 521, 734, 768, 364/787; 395/142, 162

[56] References Cited

U.S. PATENT DOCUMENTS

| | | | |
|---|---|---|---|
| 4,620,287 | 10/1986 | Yam | 364/518 |
| 4,631,690 | 12/1986 | Corthout et al. | 364/518 |
| 4,674,058 | 6/1987 | Lindbloom et al. | 364/518 |
| 4,999,789 | 3/1991 | Fiasconaro | 364/518 |
| 5,016,001 | 5/1991 | Minagawa et al. | 364/521 X |
| 5,029,106 | 7/1991 | Kai et al. | 364/518 |

OTHER PUBLICATIONS

W. Newman & R. Sproull, "Principles of Interactive Computer Graphics," pp. 315-320, 325-329, McGraw-Hill, 1979.

F. Cheng et al., "Bezier Curve Generator: A Hardware Approach to Curve Generation," International Symposium on VLSI Technology, Systems and Applications, 1985.

*Primary Examiner*—Mark K. Zimmerman
*Attorney, Agent, or Firm*—Finnegan, Henderson, Farabow, Garrett & Dunner

[57] ABSTRACT

Coordinate values of control points of a given Bezier curve are stored in a register, the contents of the register are supplied to a determination circuit to determine whether a distance between adjacent control points can further be bisected into two parts. If bisecting processing can be performed, the contents of the register are supplied to a bisection circuit, the Bezier curve is subdivided into two parts to generate new Bezier curves, and control point data of one of the new Bezier curves is applied to a stack memory and that of the other new Bezier curve is sent to the register. The contents of the register are checked by the determination circuit each time the contents of the register are updated.

18 Claims, 12 Drawing Sheets

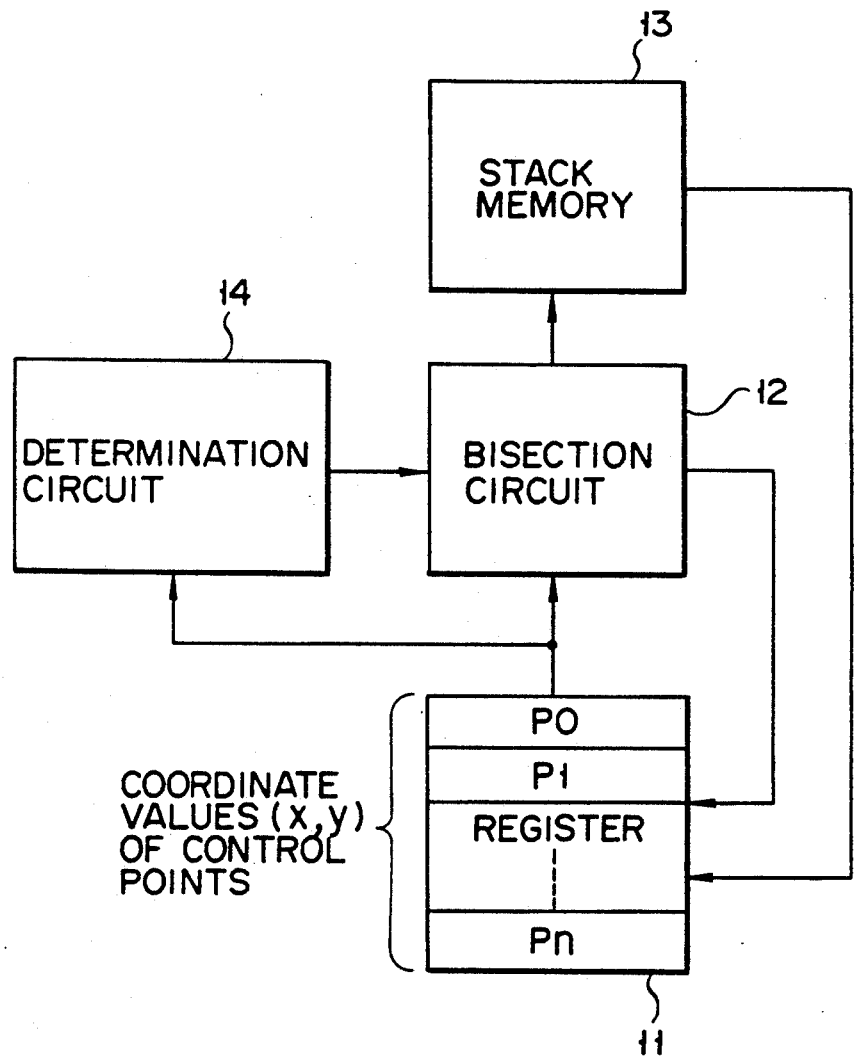
F I G. 1

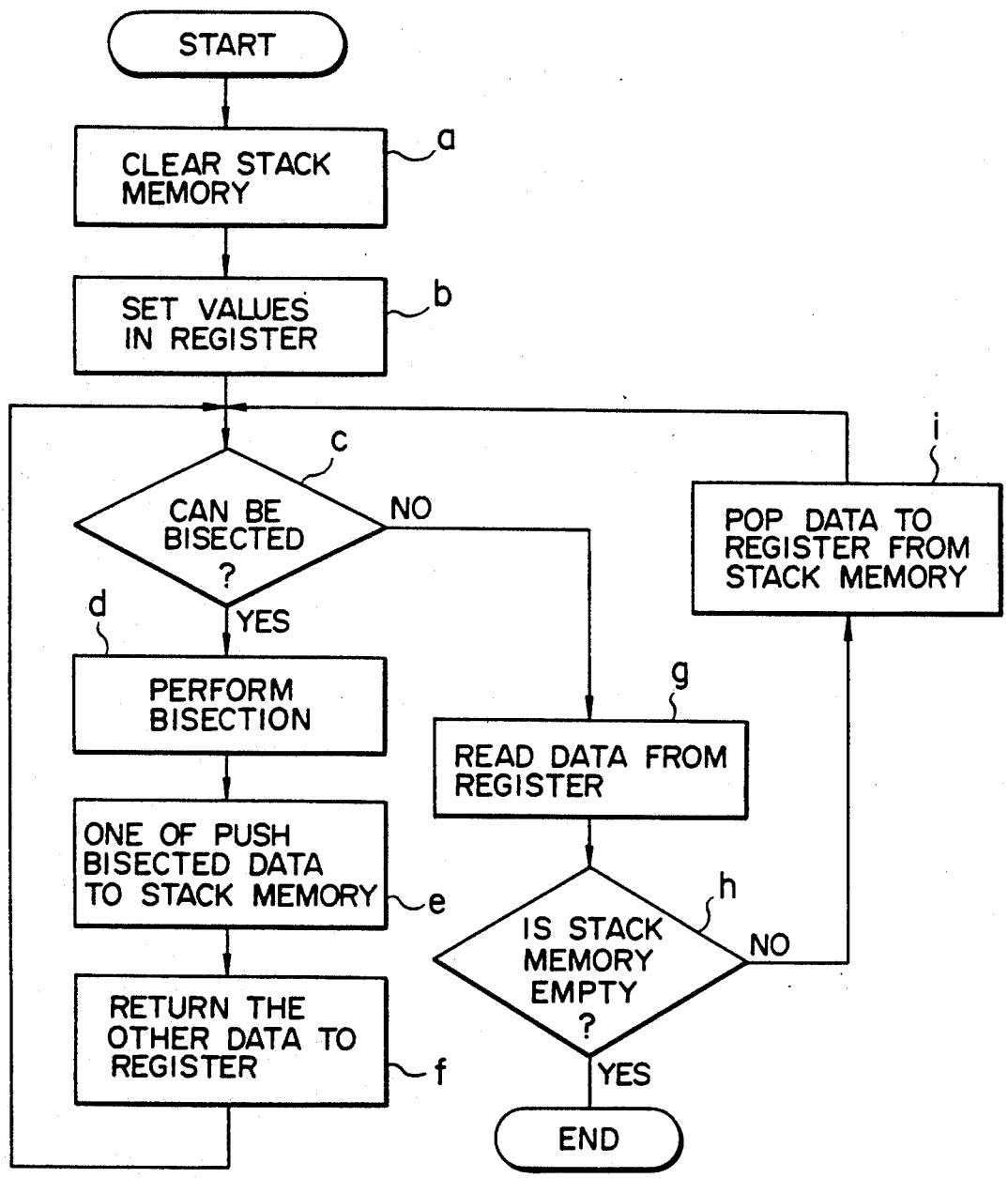
F I G. 2

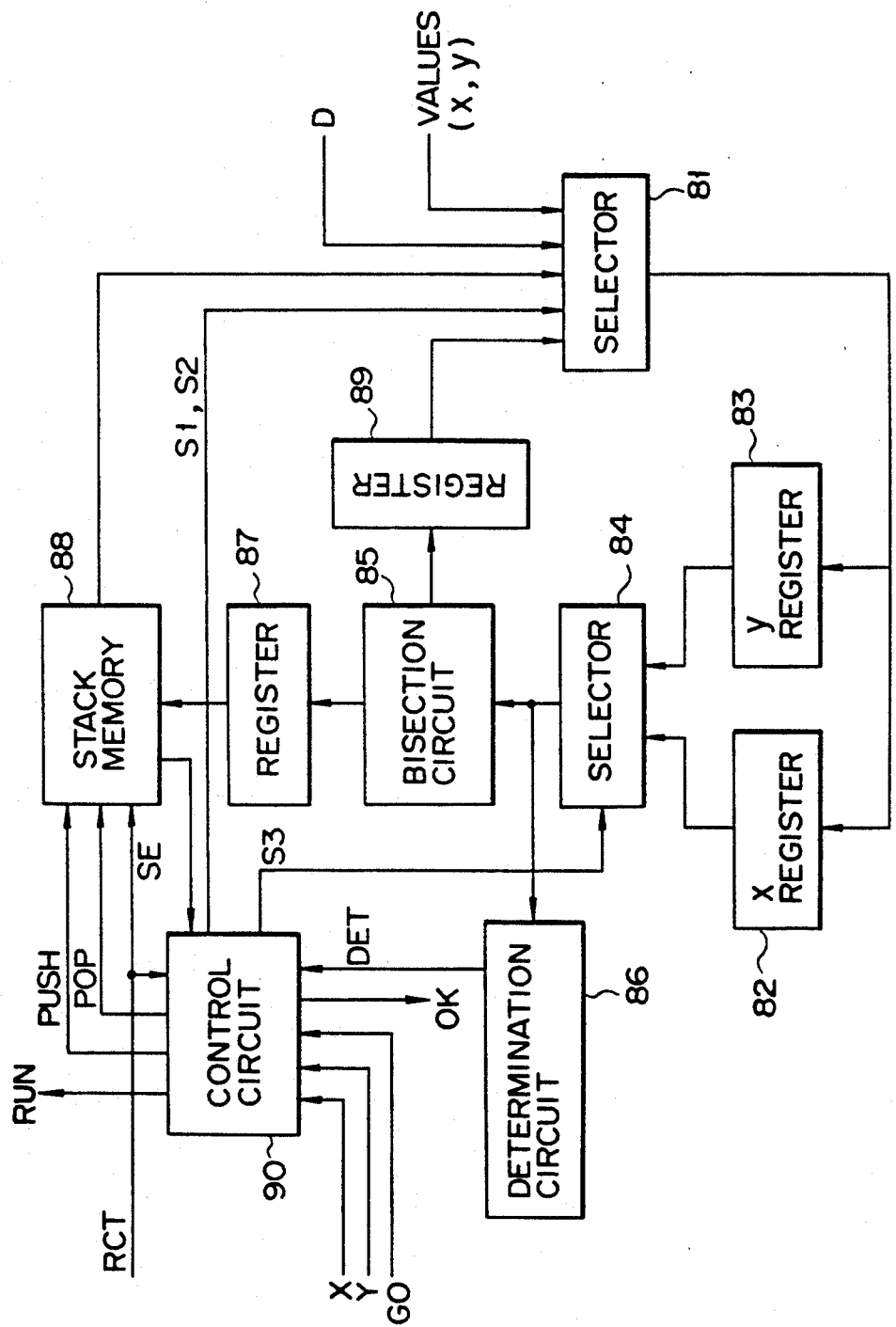
F I G. 8

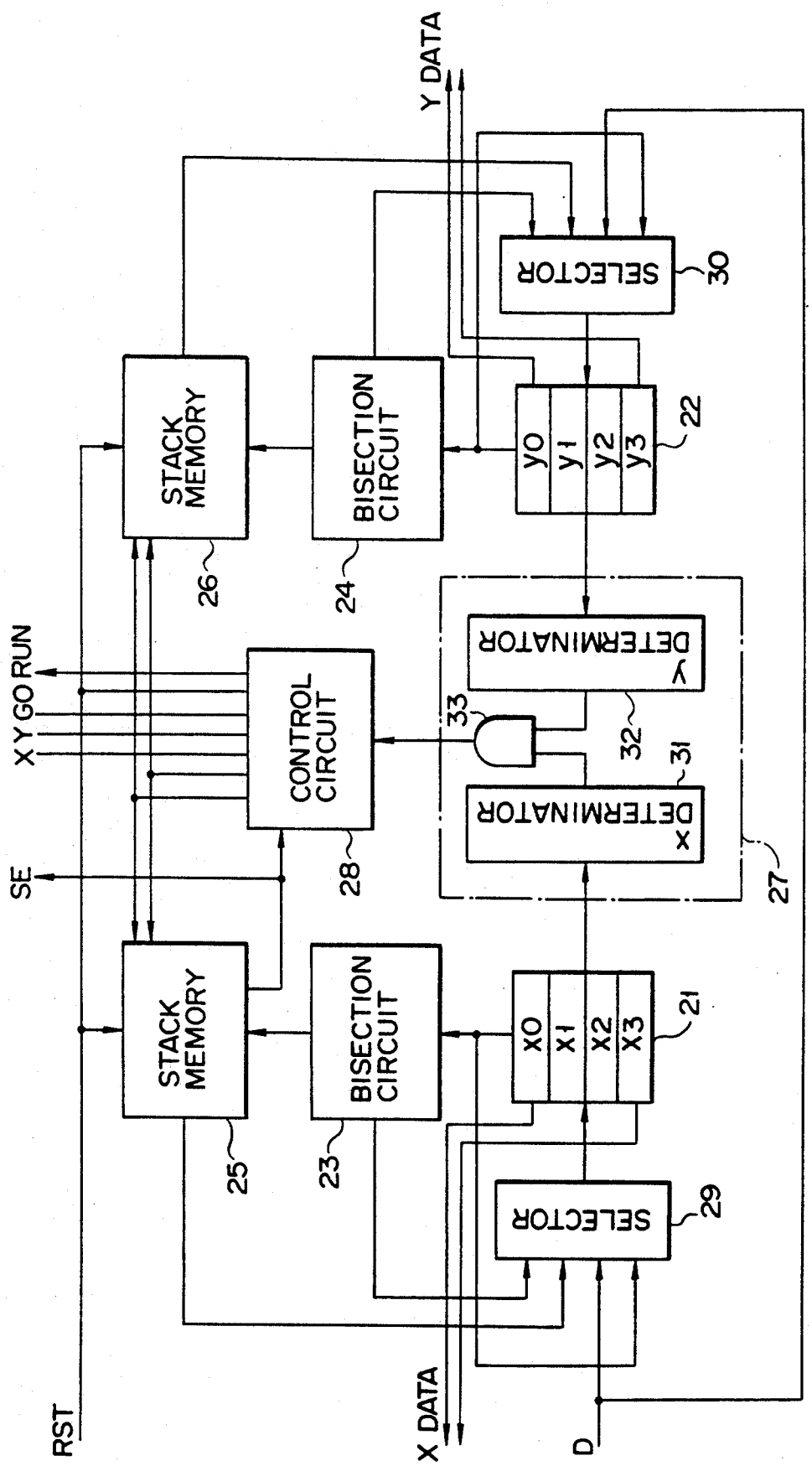
F I G. 12

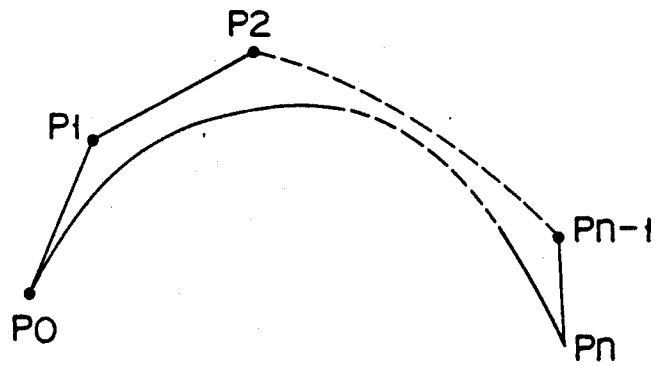
F I G. 15
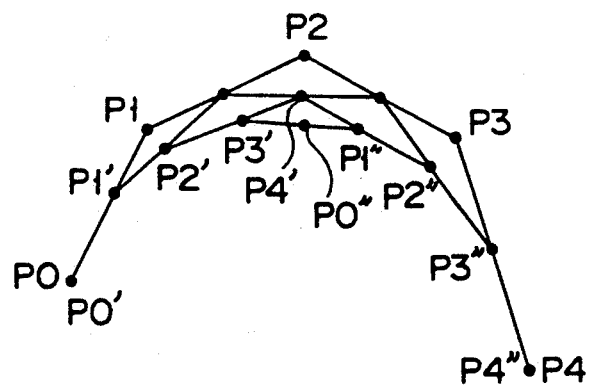
F I G. 16

APPARATUS FOR GENERATING AN ARBITRARY PARAMETER CURVE REPRESENTED AS AN N-TH ORDER BEZIER CURVE

This application is a continuation of application Ser. No. 07/456,874 filed Dec. 26, 1989, now abandoned.

BACKGROUND OF THE INVENTION

1. Field of the Invention

The present invention relates to an apparatus for generating an arbitrary parameter curve represented by a Bezier curve used to generate an outline font character for use in OA (Office Automation) equipment such as the printer of a wordprocessor or for use in the field of design using a CAD.

2. Description of the Related Art

A parameter curve represented by a polynomial can be generally represented by a Bezier curve. A Bezier curve $P(t)$ of an nth order (n is a positive integer) as shown in FIG. 15, is a curve represented by an nth-order function of a parameter $t$ ($0 \leq t \leq 1$) and is defined by the following equation using coordinates of $(n+1)$ control points $P0, P1, \ldots, Pn$ in an m-dimensional space:

$$P(t) = \sum_{i=0}^{n} Pi \cdot {}_nC_i \cdot t^i \cdot (1-t)^{n-i} \quad (1)$$

This curve was initially used in only the field of design using a CAD. In recent years, however, the curve is used in, e.g., an outline font of a high-quality character obtained by smoothing an outline of a printed character in the field of OA equipment, and a strong demand has arisen for generating a curve on the bit map at high speed.

Since the Bezier curve is conventionally generated by software processing using a computer, the processing speed is low.

In order to perform hardware processing without using a computer, equation (1) may be calculated by using a multiplier. In this case, however, the amount of hardware required is undesirably increased since a multiplier is required. In addition, multiplication must be performed (n × m) times for each control point, and addition is also required, resulting in a low processing speed. Furthermore, in the method of performing hardware processing by using a multiplier, it is difficult to determine an adequate unit value of the parameter t so that continuous points are generated to form a curve on the bit map without overlapping each other.

Alternatively, processing may be performed such that coordinate points are calculated by using a multiplier for only several values of the parameter t and points between the coordinate points are obtained by linear interpolation. In this case, however, a DDA (digital differential analyzer) is required in addition to a multiplier, resulting in a large amount of hardware. In addition, it is difficult to determine the value of t so that continuous short straight lines form a polyline sufficiently close to a curve.

As described above, in the case of generating a parameter curve by software processing using a computer, the processing speed is low. In the case of performing calculations by using exclusive hardware to generate a parameter curve, the amount of is increased, the processing speed is reduced, and it becomes difficult to determine an adequate unit value of the parameter t.

SUMMARY OF THE INVENTION

The present invention has been made in consideration of the above situation and has as its object to provide a parameter curve generator capable of generating a smooth parameter curve at a high speed with a small amount of hardware.

The parameter curve generator of the present invention comprises a register means for holding coordinate values of each control point of a given Bezier curve, a subdivision circuit means for subdividing a set of control points of a Bezier curve into two sets, and forming new control points of a pair of a first Bezier curve and a second Bezier curve corresponding to first and second halves of the given Bezier curve, a stack memory means for storing coordinate values of each control point of one (e.g., the second Bezier curve) of the first and second Bezier curves formed by the subdivision circuit means, and a determination circuit means for determining on the basis of the coordinate values of the control point of the Bezier curve held by the register means whether the latest Bezier curve is to be further subdivided into two parts by the subdivision circuit means. A subdividing operation for a set of control points supplied to the register means beforehand is repeatedly performed to generate a desired parameter curve.

The parameter curve generator of the present invention sequentially subdivides a Bezier curve into two parts by the subdivision circuit. When it is found that the Bezier curve cannot be further subdivided, coordinates of control points of the finally subdivided Bezier curves or a difference between each two coordinate values is output, thereby generating a parameter curve.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing a schematic circuit arrangement of a parameter curve generator of the present invention;

FIG. 2 is a flow chart for explaining an operation of the circuit shown in FIG. 1;

FIG. 8 is a block diagram showing an arrangement of a parameter curve generator according to the second embodiment of the present invention;

FIG. 12 shows a block diagram of a fourth embodiment of the present invention;

FIG. 15 is a view showing an nth-order Bezier curve; and

FIG. 16 is a view for explaining processing of bisection a Bezier curve for n = 4 into two parts.

DETAILED DESCRIPTION OF THE PREFERRED EMBODIMENTS

Figure 3:
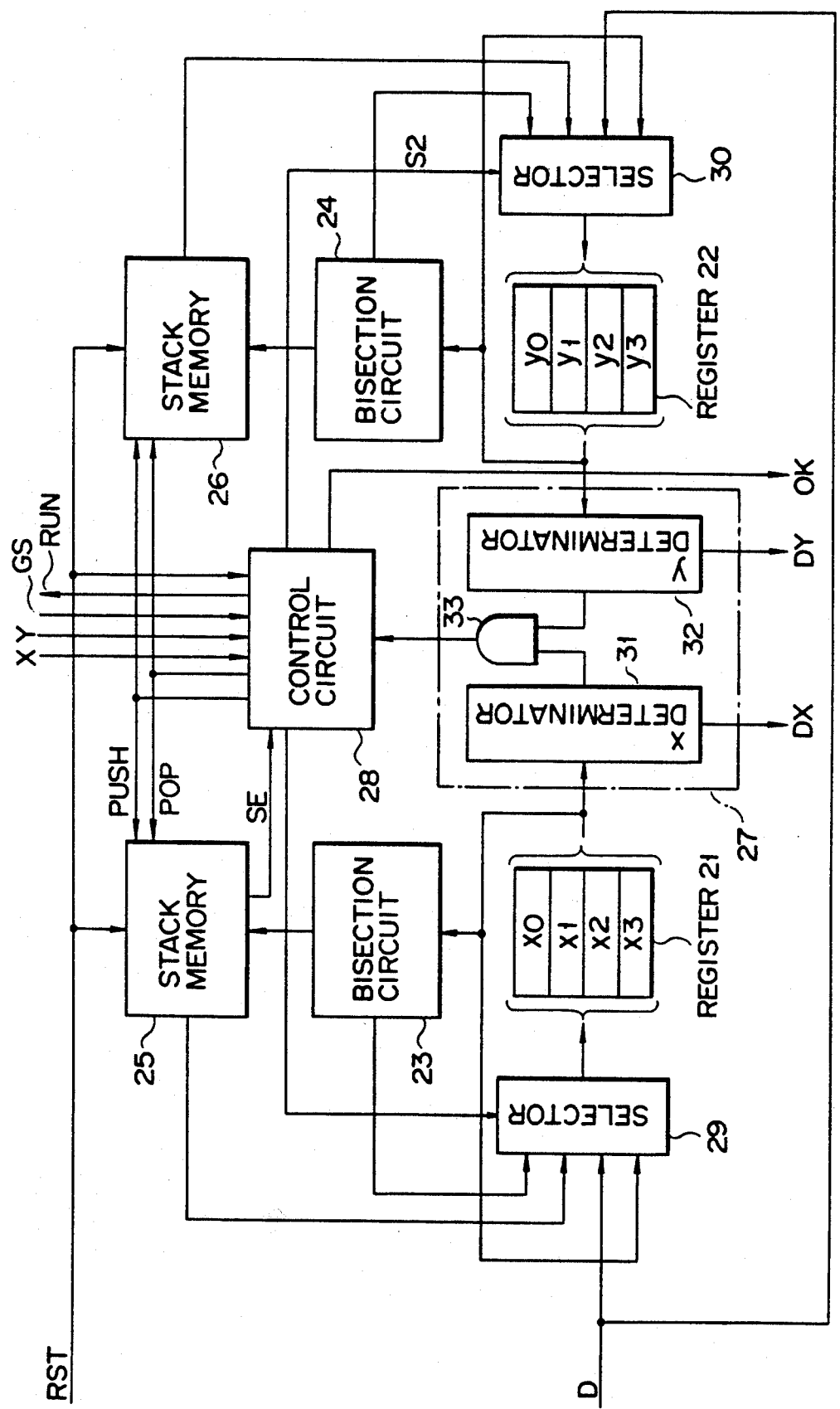
FIG. 3 is a block diagram showing an arrangement of a parameter curve generator according to the first embodiment of the present invention.

A Bezier curve will be described before explanation of embodiments of the present invention. The Bezier curve generally has the following characteristics. That is, assuming that t = u/2 in the Bezier curve given by equation (1), the following equation (2) is obtained:

$$P(t) = \sum_{i=0}^{n} \left( \sum_{j=0}^{i} Pj \cdot {}_iC_j \cdot (1/2)^i \right) \cdot {}_nC_j \cdot u^i \cdot (1-u)^{n-i} \quad (2)$$

Similarly, assuming that t = (1 + v)/2, the following equation (3) is obtained:

$$P(t) = \sum_{i=0}^{n} \left( \sum_{j=i}^{n} Pj \cdot {}_{n-i}C_{n-j} \cdot (1/2)^{n-i} \right) \cdot {}_nC_j \cdot vi \cdot (1-v)^{n-i} \quad (3)$$

In this manner, a portion of $0 \leq t \leq \frac{1}{2}$ of the Bezier curve represented by equation (1) becomes a Bezier curve for a new parameter u, and its control point Pi' is given by the following equation (4):

$$Pi' = (1/2)^i \cdot \sum_{j=0}^{i} {}_iC_j Pj \quad (4)$$

In addition, a portion of $\frac{1}{2} \leq t \leq 1$ of the Bezier curve of equation (1) becomes a Bezier curve for a new parameter v, and its control point Pi" is given by the following equation (5):

$$Pi'' = (1/2)^{n-i} \cdot \sum_{j=i}^{n} {}_{n-i}C_{n-j} Pj \quad (5)$$

These new control points can be calculated by obtaining a midpoint between adjacent control points.

In the case of a Bezier curve for n = 4, midpoints of adjacent control points are sequentially obtained as shown in FIG. 16, thereby dividing the first half of the given Bezier curve having control points P0 to P2 into a first Bezier curve having control points P0' to P4' and a second Bezier curve having control points P0" to P4".

The parameter curve generator of the present invention generates a Bezier curve at a high speed by utilizing the characteristics of the Bezier curve as described above.

The present invention will be described below. FIG. 1 is a block diagram showing a schematic arrangement of a parameter curve generator according to the present invention. This parameter curve generator comprises a register 11 for holding x values of anf y coordinates of each control point of a Bezier curve to be generated, and then holding x and y coordinate values (x, y) of a midpoint between adjacent control points of sequentially subdivided Bezier curve, a bisection or dividing circuit 12 for performing calculations represented by equations (4) and (5) to generate control points of a pair of first and second Bezier curves, a stack memory 13 for storing control points of one of the pair (first or former half and second or latter half) of Bezier curves generated by the bisection circuit 12, e.g., the second Bezier curve, and a determination circuit 14 for checking the degree of subdivision of the Bezier curve in accordance with the contents of the register 11 and in association with a parameter t, and determining whether a subdivision operation is to be continuously performed.

An operation of the circuit having the above arrangement will be described below with reference to the flow chart shown in FIG. 2.

(a) First, the stack memory 13 is cleared.

(b) Coordinate values (x, y) of control points P0 to Pn of a Bezier curve are set in the register 11.

(c) The determination circuit 14 determines whether the Bezier curve can be subdivided further.

(d) If YES in step (c), a data representing the distance between adjacent control points set in the register 11 is bisected into two parts by the bisection circuit 12.

(e) One of first- and second-halves (second half, in this case) of the Bezier curve data formed by subdivision is pushed into the stack memory 13.

(f) The other divided half data (first half, in this case) is returned to the register 11, and the operation is repeated from step (c).

(g) If the set of the control points of updated Bezier curve cannot be further subdivided, the contents of the register 11 are read out as coordinate point data representing a parameter curve to be obtained.

(h) Whether the stack memory 13 is empty is checked. If the stack memory 13 is empty, the operation is ended.

(i) If the stack memory 13 is not empty, the contents of the stack memory 13 are popped into the register 11, and the operation is repeated from step (c).

The determination circuit 14 may adopt various systems as will be described later. In accordance with the type of system, processing is performed for the contents of the register 11 read out in step (f) or (i). In the case of a determining system in which subdivision is continuously performed until a subdivision result becomes two adjacent points on a bit map, instead of outputting the contents of the register 11 in step (g), only a coordinate difference between a present control point and an immediately preceding point may be output.

FIG. 3 is a block diagram showing an arrangement of a parameter curve generator according to the first embodiment of the present invention. In the first embodiment, the present invention is applied to a generator for generating an nth-order Bezier curve in a two-dimensional space consisting of x and y coordinates and, more particularly, to a cubic Bezier curve generator for n =

3. Referring to FIG. 3, reference numeral 21 denotes an x register for holding x coordinate values of control points of a Bezier curve to be generated; 22, a y register for holding y coordinate values of the control points of the Bezier curve to be generated; 23, a bisection circuit for x coordinates; 24, a bisection circuit for y coordinates; 25, a stack memory for x coordinates; 26, a stack memory for y coordinates; 27, a determining circuit for deteriation whether the contents of the x and y registers 21 and 22 for x and y coordinates, respectively, are to be subdivided into two parts; 28, a control circuit for controlling the operation of each circuit on the basis of a DET output from the determination circuit 27; 29, a selector for selectively supplying an x coordinate value of an externally supplied control point, the contents of the bisection circuit 23 and the data popped out of the stack memory 25 to the register 21; and 30, a selector for selectively supplying a y coordinate value of an externally supplied control point, the contents of the bisection circuit 24, and the contents of the stack memory 26 to the register 22.

The x register 21 comprises four register elements in which x coordinate values $x0$, $x1$, $x2$, and $x3$ of four control points are simultaneously set. Each register element has an integer part of l0 bits and a decimal or fraction part of l1 bits. In order to generate a Bezier curve without producing an error, the bit number l1 of the fraction part must be three times the bit number l0 of the integer part. Normally, however, the bit number l1 need only be about 11 bits. In order to round the fraction part to the nearest whole number, a value Dx obtained by adding 0.5 to a coordinate of a control point of the Bezier curve is externally set in the x register 21 via the selector 29. The bisection circuit 23 for x coordinates receives the contents ($l \times 4$) bits ($l = l0 + l1$) of the x register 21, subdivides a portion between x coordinates of adjacent control points into two parts, supplies a first subdivided output having $l \times 3$ bits of a first Bezier curve to the stack memory 25, and returns a second subdivided output having $l \times 3$ bits (second Bezier curve) to the x register 21 via the selector 29.

The stack memory 25 for x coordinates is a Last in First out type memory having a width of $l \times 3$ bits and a depth of q stages. The depth q must be larger than the maximum number of division levels of a Bezier curve. For example, since a Bezier curve is repeatedly subdivided until it becomes two adjacent points on a bit map, the value of q must be about $\log_2 2^l$ with respect to the bit number l. Therefore, l is set to about, e.g., l0., 10. Similarly, the y register 22 for y coordinates comprises four register elements in which y coordinate values $y0$, $y1$, $y2$, and $y3$ of four control points are simultaneously set. Each register element has an integer part of 10 bits and a decimal part of 11 bits. A value Dy obtained by adding 0.5 to a coordinate of a control point of a Bezier curve is externally set in the y register 22 via the selector 30. The bisection circuit 24 for y coordinates receives and subdivides the contents ($l \times 4$) bits of the y register 22 into two parts, supplies a first divided output having ($l \times 3$) bits to the stack memory 26 for y coordinates, and returns a second bisected output having ($l \times 3$) bits to the y register 22 via the selector 30.

The determination circuit 27 comprises an x-coordinate determinator 31 for outputting a determination signal to the control cicuit 28 via an AND gate 33 and an x-coordinate difference on DX the basis of integer parts of the data $x0$ and $x3$ in the x register 21, a y-coordinate determinator 32 for outputting a determination signal to the control circuit 28 via the AND gate 33 and a y-coordinate difference DY on the basis of integer parts of the data $y0$ and $y3$ in the y register 22, and an AND gate 33 for receiving the determination output signal outputs from the two determinators 31 and 32.

Since x coordinate values Dx added with 0.5 are supplied as data to the x register 21 in advance, the decimal or fraction parts can be rounded to the nearest whole numbers by extracting only the integer parts of the respective registers. The x-coordinate determinator 31 calculates the difference between the interger parts of the data $x0$ and $x3$, i.e., $x0$ (integral part) $\pm x3$ (integer part). If the difference is 0 or $\pm 1$, the determinator 31 outputs a determination signal "1". In other cases, the determinator 31 outputs a determination signal "0". Similarly, the y-coordinate determinator 32 calculates a difference between the y coodinate values Dy, i.e., the integer parts of the data $y0$ and $y3$, i.e., $y0$ (integer part) $- y3$ (integer part). If the difference is 0 or $\pm 1$, the determinator 32 outputs a determination signal "1". In other cases, the determinator 32 outputs a determination signal "0". The determination signals from the two determinators 31 and 32 are supplied to the AND gate 33, and the output DET from the AND gate 33 is supplied as a final determination result to the control circuit 28. On the basis of this determination result, the control circuit 28 generates various control signals S1, S2, SE for performing push and pop control of the stack memories 25 and 26 and data selection control of the selectors 29 and 30.

Figure 4:
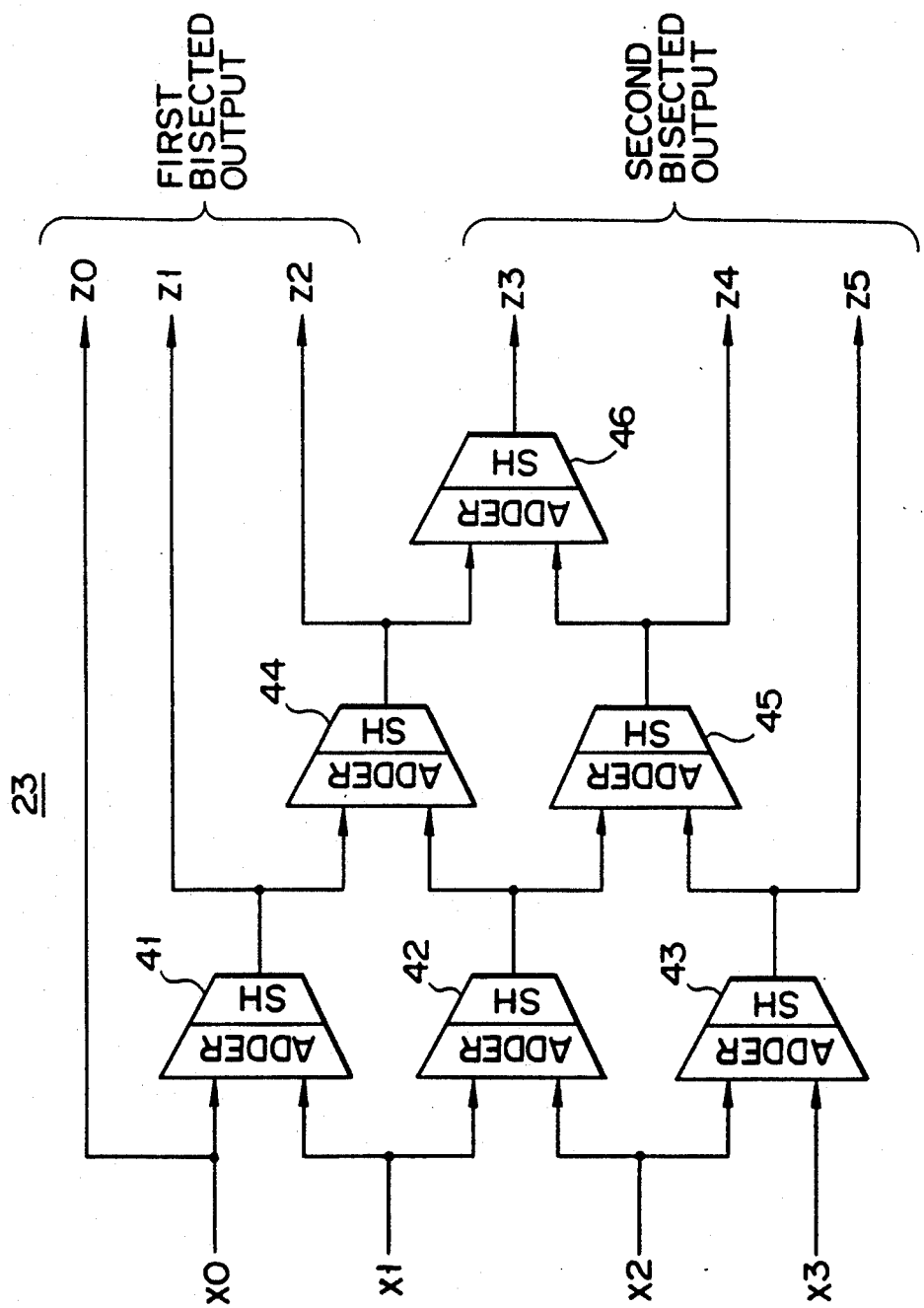
FIG. 4 is a circuit diagram showing a detailed arrangement of a bisection circuit in the circuit arrangement of the first embodiment shown in FIG. 3.

Since the x-and y-coordinate dividing circuits 23 and 24 have the same arrangement and function, only a detailed circuit configuration of the x-coordinate bisection circuit 23 is shown in FIG. 4. The bisection circuit 23 comprises six adders/shifters 41 to 46 for receiving the contents $x0$, $x1$, $x2$, and $x3$ of the register 21, adding each two inputs, and shifting the addition result bits to the right by one bit, thereby obtaining a subdivided first half output consisting of x coorinates of new control points $z0$, $z1$, and $z2$ and a subdivided second half output consisting of new control points $z3$, $z4$, and $z5$. That is, the adder 41 adds and shifts the inputs $x0$ and $x1$. The adder/shifter 42 adds and shifts the inputs $x1$ and $x2$. The adder 43 adds and shifts the inputs $x2$ and $x3$. An output from the adder/shifter 41 is shifted to the right by one bit to be bisected and supplied to the adder/shifter 44. An output from the adder/shifter 42 is also shifted to the right by one bit to be bisected and supplied to the adder/shifter 44. The adder 44 adds and shifts the bisected outputs from the adders/shifters 41 and 42. An output from the adder/shifter 42 is bisected and supplied to the adder/shifter 45. An output from the adder/shifter 43 is bisected and supplied to the adder/shifter 45. The adder/shifter 45 adds and shifts the bisected outputs from the adders/shifter 42 and 43. An output from the adder/shifter 44 is bisected and supplied to the adder/shifter 46. An output from the adder/shifter 45 is also bisected and supplied to the adder/shifter 46. The adder/shifter 46 adds the bisected outputs from the adders/shifter 44 and 45. An output of the adder/ shifter 46 provides a midpoint of the calculated Bezier curve. Of the new control points subdivided into two parts, one part or the latter half consists of $x3$, $z5$, $z4$, and $z3$, and the other part or the former half consists of $z3$, $z2$, $z1$, and $z0$. One point is omitted from data to be supplied to the stack memory 25.

Figure 5:
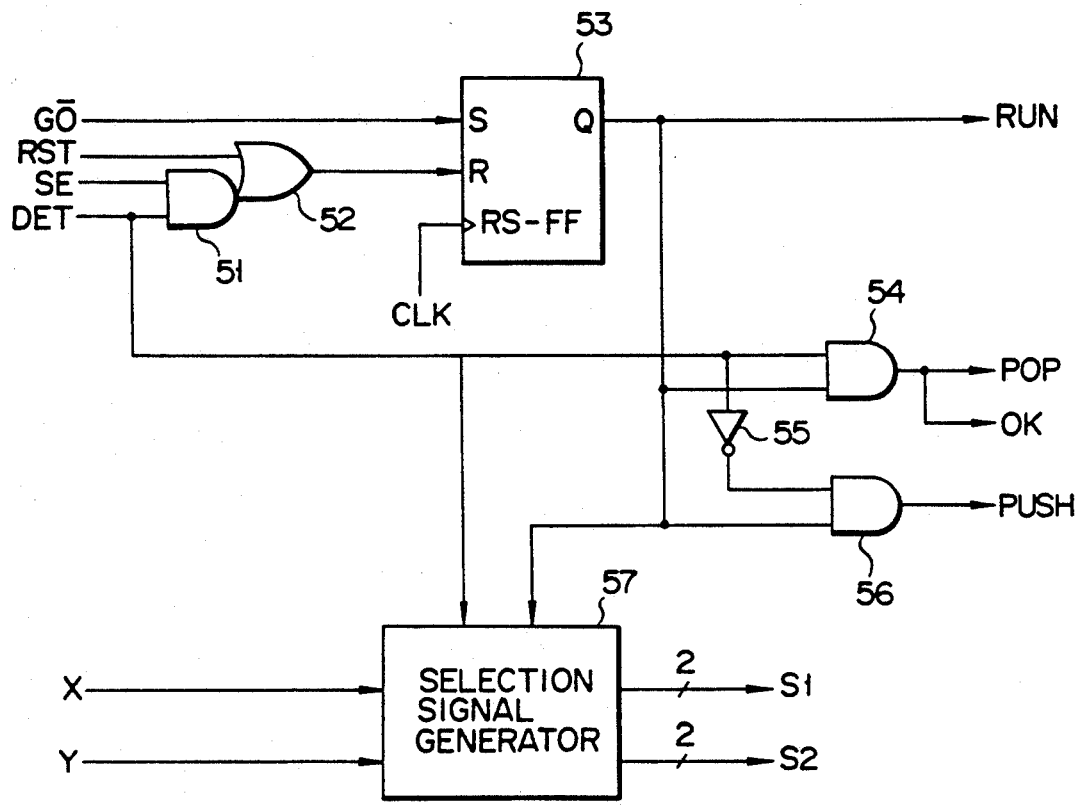
FIG. 5 shows a block diagram of a control circuit in the circuit arrangement of FIG. 3.

FIG. 5 shows a detailed circuit structure of the control circuit 28 of the embodiment shown in FIG. 3. In FIGS. 3 and 5, signals X, Y, Go and RST are supplied from an external device (not shown). The signals X and Y are register write signals and are set at "1" when coordinate value data is to be written into the registers 21 and 22, respetively. The signal Go is a starting signal which is set at "1" when the generation of the coordinates of the control points for a given Bezier curve is started. The signal RST is used to initialize the control circuit 28 and stack memories 25 and 26.

The signal Go is supplied to the set terminal of the RS-FF (reset-set flip flop) 53 which is reset by an output from OR gate 52. One input of the OR gate 52 is supplied with the RST signal and the other input thereof is supplied with an output of an AND gate 51. The AND gate 51 is supplied with a signal SE and the output DET of the determination circuit 27. The signal SE is supplied from the stack memory 25 to represent that the stack memory 25 is empty. The RS-FF 53 is supplied with a clock signal CLK and delivers a set output Q as a RUN signal which is a status signal representing that the generation of the Bezier curve is executed.

The signal DET is further supplied to one input of an AND gate 54, one input of an AND gate 56 via an inverter 55 and one input of a select signal generation circuit 57. The RUN signal is also supplied to the AND gates 54 and 56 at the other end thereof and to a second input of the select signal generation circuit 57. The register write signals X and Y are supplied to third and fourth input of the select signal generation circuit 57. An output of the AND gate 54 is used as a POP signal. The signal POP is used to instruct the stack memories 25 and 26 of the popping operation therein. An output of the AND gate 56 is used to instruct the stack memories 25 and 26 of the push operation via the PUSH signal.

Figure 6:
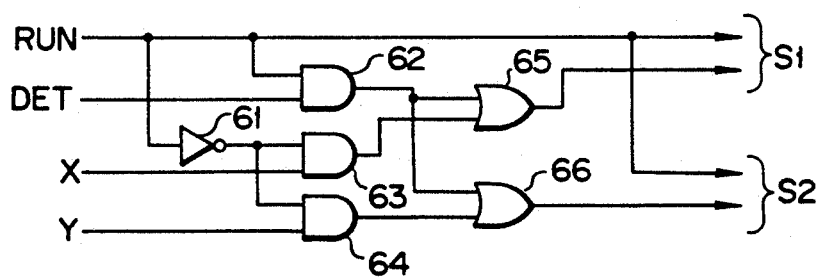
FIG. 6 shows a block diagram of a select signal generator in the circuit arrangement of FIG. 5.

The select signal generating circuit 57 is arranged to output the select signals S1 and S2 according to the intput signals DET, RUN, X and Y, as shown in FIG. 6.

Referring to FIG. 6, the signal RUN is supplied to inverter 61 and to one end of an AND gate 62. An inverted output of the inverter 61 is supplied to AND gates 63 and 64 at one end thereof, respectively. The DET signal is supplied to the other end of the AND gate 62 and the X and Y signals are supplied to the AND gates 63 and 64 at their other ends, respectively. Output of the AND gate 62 is supplied to OR gates 65 and 66 at one end, respectively, and outputs of the AND gates 63 and 64 are supplied to the other inputs of the OR gates 65 and 66. The outputs of the OR gates 65 and 66 are supplied together with the RUN signal as two-bit select signals S1 and S2 which are supplied to selectors 29 and 30.

For example, the select signal S1 for an x coordinate consists of four sets of two-bit signals (00), (01), (10) and (11). When the contents of the select signal S1 is (00), to contents of the register 21 is held therein. When the select signal S1 is (01), the selector 29 is opened so that the external data Dx is received by the register 21. When the select signal is (10), outputs of the bisection circuit 23 are stored in the registers x1 to x3 and the contents of the register x3 are stored in the register x0. When the select signal is (11), outputs of the stack memory 25 ar stored in the registers x1 to x3 and the contents of the register x3 are written into the register x0. The other select signal S2 can be formed similarly.

Figure 7:
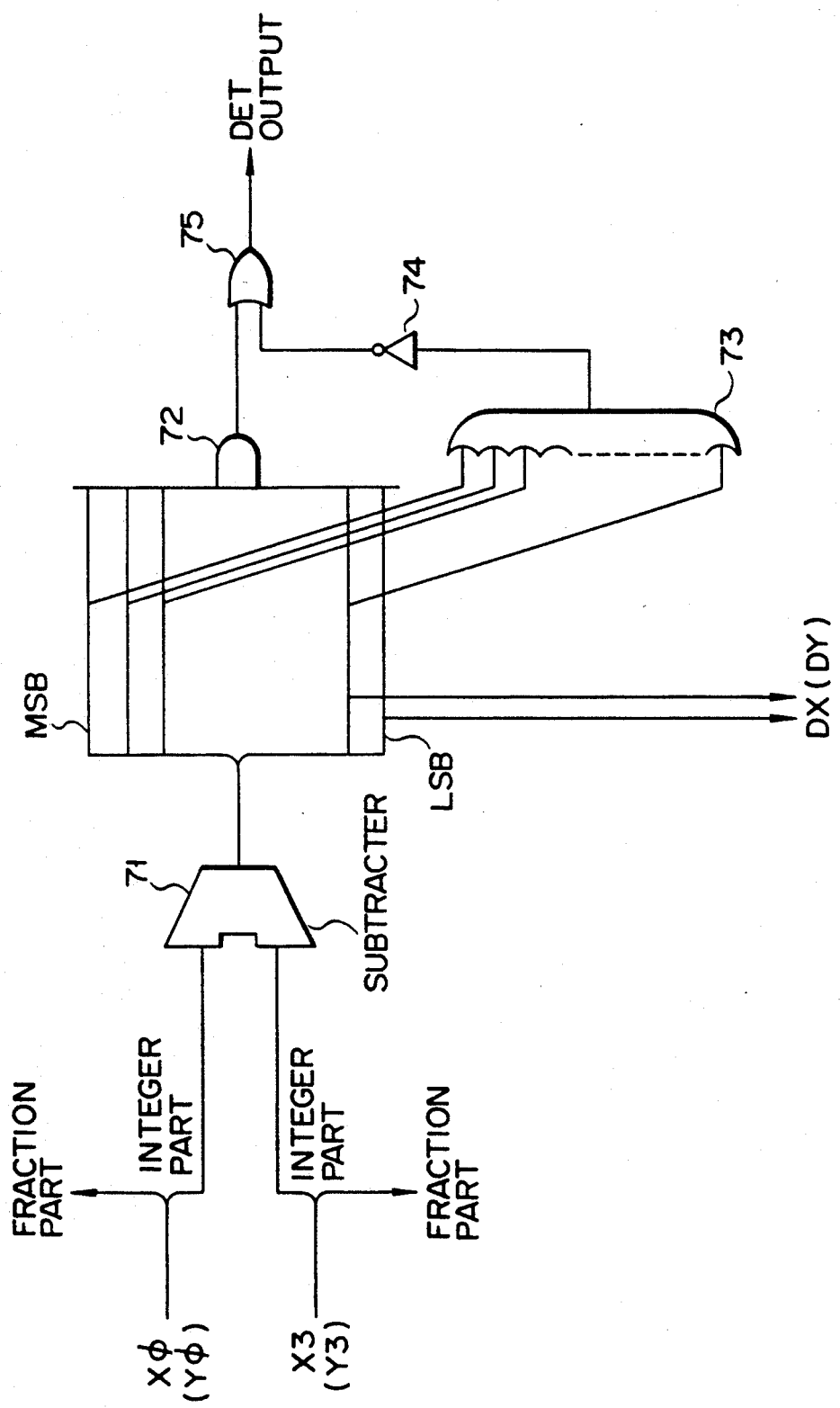
FIG. 7 shows a block diagram of a determination circuit in the circuit arrangement of FIG. 3.

FIG. 7 shows a practical circuit of the determination circuit 27 of FIG. 3. In FIG. 3, since the x determination circuit 31 and the y deterination circuit 32 are identical in structure, only the x determination circuit 31 is shown in FIG. 7. The integer parts of the coodinate values x0 and x3 which consist of integer parts and fraction parts, respectively, are supplied to the input terminals of substraction circuit 71. The fracton parts of the values x0 and y0 are not used in determination circuit 27. Each bit of the result of the substraction is supplied to the respective input terninals of AND gate 72, and each bit except the LSB of the result of the substraction is supplied to the respective input teminals of OR gate 73. Output of the AND gate 72 is supplied to one input of OR gate 75 and the output of the OR gate 73 is supplied to the other input of the OR gate 75 via an inverter 74. The output of the OR gate 75 is supplied to the control circuit 28 of FIG. 3 as the determination output of x coordinate value DETx. The least significant bit LSB and the second significant bit next to the LSB of the output from the subtracter 71 is delivered as the two bit output DX.

In FIG. 7, when the result of the subtraction at the subtracter 71 is 1 or −1, the output of the AND gate 72 becomes "1" and, when the result is 0, the output of the OR gate becomes "0" and the output of the inverter becomes "1". Therefore, the output of the OR gate 75 becomes 1 when the subtraction result is 1, −1 or 0.

The circuit of this embodiment generates a subdivided Bezier curve in accordance with the following sequence.

(1) The x- and y-coordinate stack memories 25 and 26 are cleared.

(2) 0.5 is added to each of the x and y coordinate values of control points P0, P1, P2, and P3 of a Bezier curve. The obtained values are set as x0, x1, x2, x3, and y0, y1, y2, and y3 in the registers 21 and 22 via the selectors 29 and 30.

(3) The determination circuit 27 determines whether the x and y coordinate values of control points P0 to P3 set in the registers 21 and 22 are to be subdivided into two parts.

(4) If the determination result of the determinating circuit 27 is "0", i.e., if bisection can be performed, each of the bisection circuits 23 and 24 bisects the coordinate values into two parts. The second subdivided divided output is pushed into the x- and y-coordinate stack memories 25 and 26, while the first subdivided output is set in the registers 21 and 22 via the selectors 29 and 30, respectively. At this time, x0 and y0 in the registers 21 and 22 remain the same. Thereafter, the operation of step (3) is repeated.

(5) If the determination result of the determination circuit 27 is "1", the difference between the adjacent x coordinates and the difference the adjacent y coordinates are output from the determinators 31 and 32. The contents of x3 and y3 are transferred to x0 and y0, and the data popped from the stack memories 25 and 26 are set in x1 to x3 and y1 to y3. Thereafter, the operation of step (3) is repeated.

Simultaneously with the operations of steps (1) to (5), a Bezier curve can be generated on a bit map by using the difference between the x adjacent coordinates and the difference between the adjacent x coordinates.

In the generator of the above embodiment, a set of control points is subdivided into two sets and a determination whether the control points should be subdivided further is preformed every one clock cycle. If the determination result is "1", coordinates of one point of a Bezier curve can be generated. Since the average frequency of the determination result "1" of the determination circuit 27 is ½, coordinates of one point of the Bezier curve can be generated every two clock cycles on the average.

FIG. 8 is a block diagram showing an arrangement of a parameter curve generator according to the second embodiment of the present invention. This curve generator differs from that of the first embodiment of FIG. 3 embodiment in that only one bisection circuit 85 and one stack memory 88 are used for both x and y coordinates. That is, the contents of a register (x register) 82 for x coordinates and a register (y register) 83 for y coordinates are selected by a selector 81 and are supplied to the bisection circuit 85 and to the determination circuit 86 for both x and y coordinates. A first bisected output from the bisection circuit 85 is temporarily stored in a register 87 and is then supplied to the stack memory 88 for both x and y coordinates. A second divided output from the bisection circuit 85 is temporarily stored in a register 89. The contents of the stack memory 88 and the register 89 and external data are supplied to the x register 82 or the y register 83 via the selector 81. Note that a control circuit 90 for receiving the output from the determination circuit 86 and for generating various control signals has a similar arrangement as the circuit of FIGS. 5 and 6.

In the curve generator of the second embodiment, operations of the bisection circuit 85 and the stack memory 88 differ from each other for x and y coordinates. That is, when the bisection circuit 85 performs a subdivision operation for a set of x coordinates, a push or pop operation of the stack memory 88 is performed for a set of y coordinates. To the contrary, when the push or pop operation of the stack memory 88 is performed a set of for an x coordinate, the bisection circuit 88 performs the bisection operation for a y coordinate. Therefore, operations in the following steps (1) and (2) are alternately, repeatedly performed.

(1) The contents of the x register 82 are selected by the selector 84 and are supplied to the bisection circuit 85 and the determination circuit 86. Each of the registers 87 and 89 stores an output from the bisection circuit 85 for a y coordinate corresponding to an immediately preceding clock. If the output from the determination circuit 86 is "0", the contents of the register 87 are pushed into the stack memory 88, and the contents of the register 89 are set in the y register 83 via the selector 81. If the output from the determination circuit 86 is "1", the contents of the stack memory 87 are popped and set in the y register 83 via the selector 81.

(2) The contents of the y register 83 are selected by the selector 84 and are supplied to the bisection circuit 85 and to the determinating circuit 86. At this time, each of the registers 87 and 89 stores an output from the bisection circuit 85 for an x coordinate corresponding to an immediately preceding clock. If the output from the determination circuit 86 is "0", the contents of the register 87 are pushed into the stack memory 88, and the contents of the register 89 are set in the x register 82 via the selector 81. If the output from the determination circuit 86 is "1", the contents of the stack memory 88 are popped and set in the x register 82 via the selector 81.

In this second embodiment, only one bisection circuit having a comparatively large circuit configuration constituted by adders/shifters need be used. Therefore, when an IC circuit arrangement is formed on a chip, the chip area can be reduced to be smaller than that of the curve generator according to the first embodiment.

A bisection circuit (represented by reference numerals 23 and 24 in FIG. 3 or by reference numeral 85 in FIG. 8) used in the curve generator of the present invention is constituted by adders/shifters as described above. If a CLA (carry look ahead) type adder is used, bisection processing can be performed at a high speed. The CLA type adder, however, has a very large circuit scale. Therefore, the entire chip area is increased when the IC circuit arrangement is thereby formed. To the contrary, if the ripple carry type adder is used, a circuit scale can be reduced. Since, however, the carry propagation time is prolonged, high-speed bisection processing cannot be performed.

Figure 9:
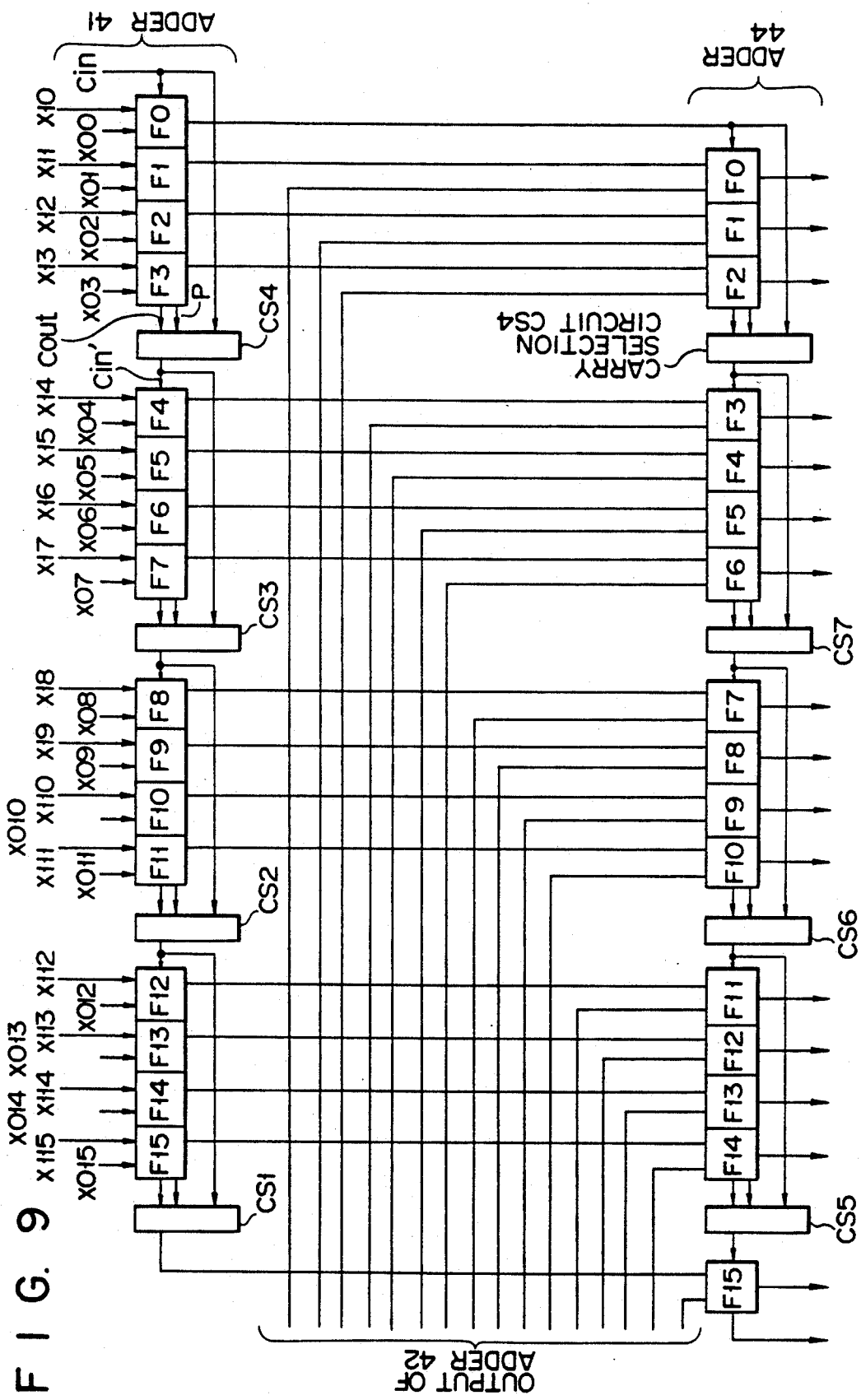
FIG. 9 is a block diagram showing a detailed arrangement of a part of the bisection circuit shown in FIG. 4.

In the curve generator of the present invention, therefore, the bisection circuit as shown in FIG. 4 is constituted as follows to reduce the circuit scale and to increase the speed of bisection processing. FIG. 9 is a circuit diagram showing a detailed arrangement of portions of two adders 41 and 44 shown in FIG. 4. Referring to FIG. 9, inputs x0 and x1 are constituted by 16 bits of x00 to x015 and 16 bits of x10 to x115, respectively, and each adder is constituted by 16 full adders. That is, the adder 41 for receiving x0 and x1 includes 16 full adders F0 to F15 which are divided into four blocks of full adders F0 to F3, F4 to F7, F8 to F11, and F12 to F15. A carry selector CS is provided at the end of each block and receives a carry input signal Cin supplied to the block, a carry output singal Cout output from the block, and a carry propagation condition signal P. On the basis of the carry propagation condition signal P generated in each block, the corresponding carry selector CS selects the carry input signal Cin from the immediately preceding block or the carry output signal Cout and outputs a carry input signal Cin' to the subsequent block. The output from the adder 41 and the output from the adder 42 shown in FIG. 4 are supplied to the adder 44. In order to halve the outputs from the adders 41 and 42, these outputs must be shifted by one bit and then supplied to the adder 44. The adder 44 has 16 full adders F0 to F15. The 16 full adders F0 to F15 are located left by one bit with respect to the adder 41 as shown in FIG. 9, while the carry selectors CS are arranged at positions corresponding to the carry selectors CS in the adder 41. That is, in the upper and lower adders of this dividing circuit, the full adders and the carry selectors are arranged such that the block boundaries of the full adders coincide with each other. The upper/lower relationships between the adders are as follows. That is, in FIG. 4, the adders 41, 42, and 43 are lowermost, the adders 44 and 45 are upper with respect to these adders, and the adder 46 is upper with respect to the two adders 44 and 45.

In this manner, in the bisection circuit, the full adders are divided into four blocks, and a carry selector is provided at the end of each block. Therefore carry propagation can be limited within seven bits in each adder regardless of the bit length of the adder. In addition, the full adders and the carry selectors are arranged such that the block boundaries of the full adders coincide with each other between the upper and lower adders. Therefore, the propagation length can be limited within eight bits even when propagation is to be performed from the lower to upper adders. As a result, comparable processing speed, as obtained when CLA type adders are used, can be obtained. In addition, the circuit scale can be reduced to be smaller than that obtained by using CLA type adders, although it is slightly larger than that obtained when ripple carry type adders are used.

Figure 10:
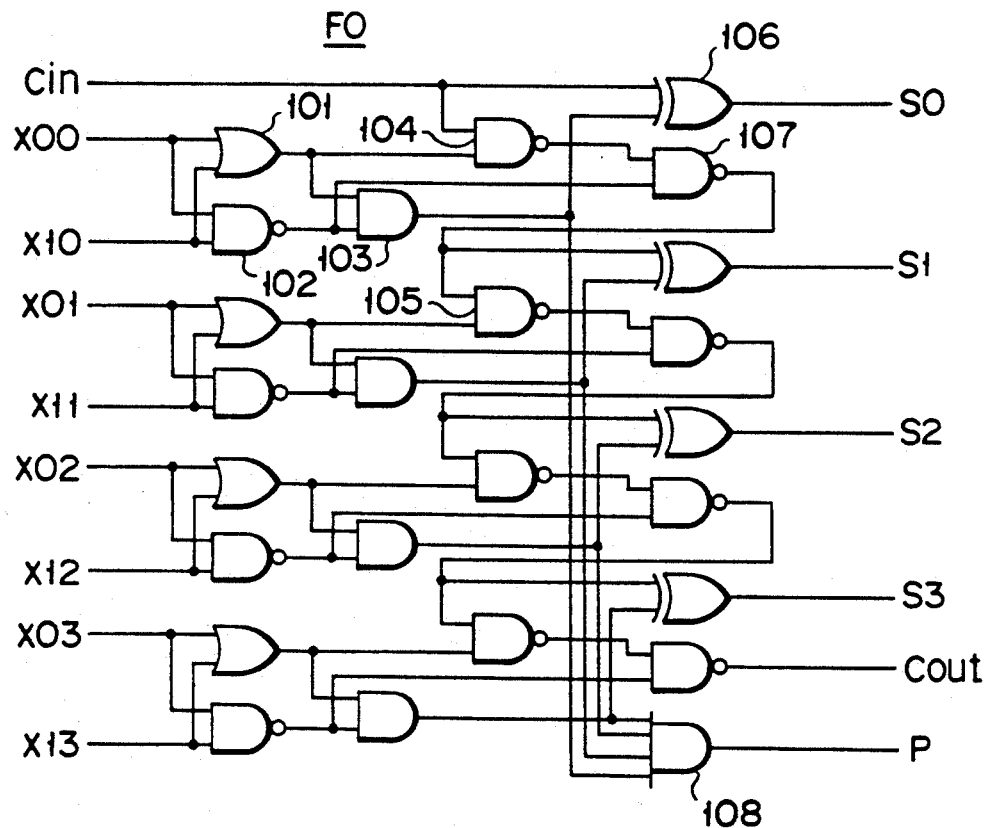
FIG. 10 is a circuit diagram showing a detailed arrangement of a full adder used in the circuit shown in FIG. 9.

FIG. 10 is a circuit diagram showing a detailed arrangement of the full adder block used in the circuit shown in FIG. 9. This block is the lowermost full adder block F0–F3 of the adder 41. The full adder F0 has a known arrangement in which one bit is constituted by an OR gate 101, a NAND gate 102, an AND gate 103, NAND gates 104, and 105 an exclusive OR gate 106, and a NAND gate 107, An AND gate 108 for generating a carry propagation condition signal is also provided. The other full adders have the same arrangement except for their inputs.

Figure 11:
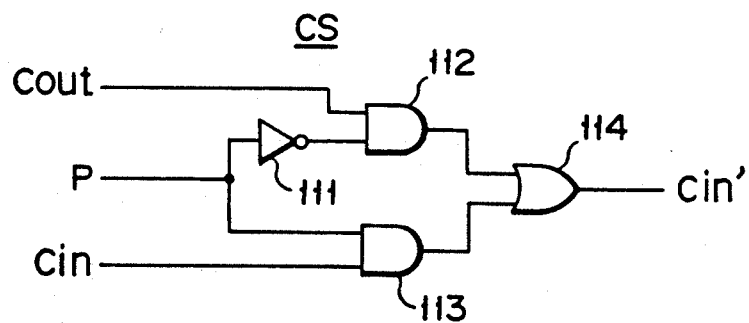
FIG. 11 is a circuit diagram showing a detailed arrangement of a carry selector used in the circuit shown in FIG. 9.

FIG. 11 is a circuit diagram showing a detailed arrangement of the carry selector used in the circuit shown in FIG. 9. This circuit comprises an inverter 111 for inverting the carry propagation condition signal P, an AND gate 112 for receiving the carry output signal Cout generated by each block of the full adder circuit and an output from the inverter 111, an AND gate 113 for receiving the carry input signal Cin and the carry propagation condition signal P, and an OR gate 114 for receiving outputs from the AND gates 112 and for 113 and outputting the carry input signal Cin' for the upper block. In this circuit, when the carry propagation condition signal P is "1", the carry input signal Cin is output as the carry input signal Cin' for the upper block. When the signal P is "0", the carry output signal Cout is output.

The third embodiment of the present invention will be described below. In each of the above first and second embodiments, the determination circuit performs determination such that the bisection operation is continuously performed until the bisection result of the bisection circuit becomes two adjacent points on a bit map. The determination, however, may be performed as follows. For example, the determining circuit 27 shown in FIG. 3 receives the integer parts of the contents x0 to x3 of the register 21 and the integer parts of the contents y0 to y3 of the register 22, and detects that a Bezier curve determined by these four control points is sufficiently close to a straight line so as to detect a flatness.

Figure 13:
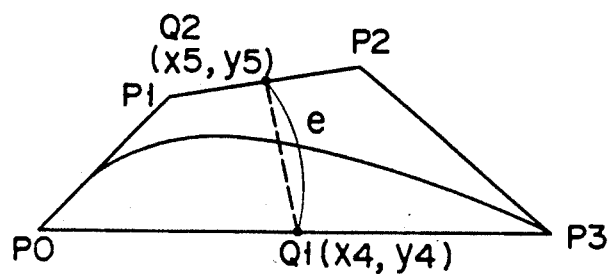
FIG. 13 is a view for explaining an operation of a determining circuit used in the third and fourth embodiment of the present invention.

In this embodiment, in a Bezier curve shown in FIG. 13 and constituted by four control points P0 to P3, the length representing the flatness e, a line segment $\overline{Q1Q2}$ connecting a midpoint Q1 (Q1 = (P0 + P3)/2) between the control points P0 and P3 and a midpoint Q2 (Q2 = (P1 + P2)/2) between the control points P1 and P2 is calculated, and a degree of deviation between the Bezier curve and an approximate straight line is determined on the basis of the calculated value, as shown in FIG. 13. In this case, the following determination methods may be performed.

Assume that an allowable maximum value (to be referred to as "flatness" hereinafter) of deviation between the Bezier curve and the approximate straight line is e. In one method, if both the differences of the x and y coordinate values of the line segment $\overline{Q1Q2}$ are detected to be smaller than the flatness e by computing a distance between the midpoints (x4, y4), (x5, y5) using a computer (not shown), the subdivision of the Bezier curve is terminated and the deviation with respect to the approximate straight line is determine to fall within the allowable range. In the other method, when the length of the line segment $\overline{Q1Q2}$ becomes smaller than the flatness e, the subdivision is terminated and the deviation with respect to the approximate straight line is determined to fall within the allowable range.

Moreover, in a further method, when absolute values of (x4–x5), (y4–y5) are detected to become smaller than the flatness e by means of a computer (not shown), the subdivision operation is terminated.

The fourth embodiment of the present invention will be described below.

The circuit arrangement of the fourth embodiment of FIG. 12 is similar to that of the first embodiment of FIG. 3. Therefore, the explanation of the structure of the circuit of FIG. 12 may be omitted here.

In FIG. 12, the control circuit 28 is initialized by the RST signal and the stack memories 25 and 26 are cleared by the same RST signal. Then, the register write signal X of "1" is supplied to the control circuit 28 so as to set the coordinate values x0 to x3 into the register 21 via selector 29. Then, the register write signal Y becomes "1" and the coordinate values y0 to y3 are set to the register 22 via the selector 30.

Then, the Go signal of "1" is supplied to the control circuit 28 so that the subdivision operation is started at the bisection circuits 23 and 24. As shown in FIG. 13, the coordinates (x4, y4) of the midpoint Q1 between the control points P0 and P3 and the coordinates (x5, y5) of the midpoint Q2 between the control points P1 and P2 are obtained in the bisection circuits 23 and 24 in the case of the Bezier curve. The obtained coordinate values x4, x5 and y4, y5 are respectively supplied to the determination circuit 27 in which a calculation of (x1 + x2 − x0 − x3) is performed. When the results of the calculation become smaller than a predetermined value, the determination output of the determination circuit 27 becomes 1, −1 or 0, and the flatness e is determined to fall within the allowable range. The detailed explanation of the determination circuit 27 will be described later by referring to FIG. 14.

In FIG. 12, when the signal RUN becomes 0, signals XDATA and YDATA are delivered from the registers 21 and 22, respectively, so as to check the contents of values x0, x3, y0 and y3. If the signal SE from the stack memory 25 is "1" in this time, the stack memory 25 is detected to be empty and the operation is terminated. If the stack memory 25 is not empty, the operation of the subdivision operation is repeated until the stack memory 25 becomes empty.

Figure 14:
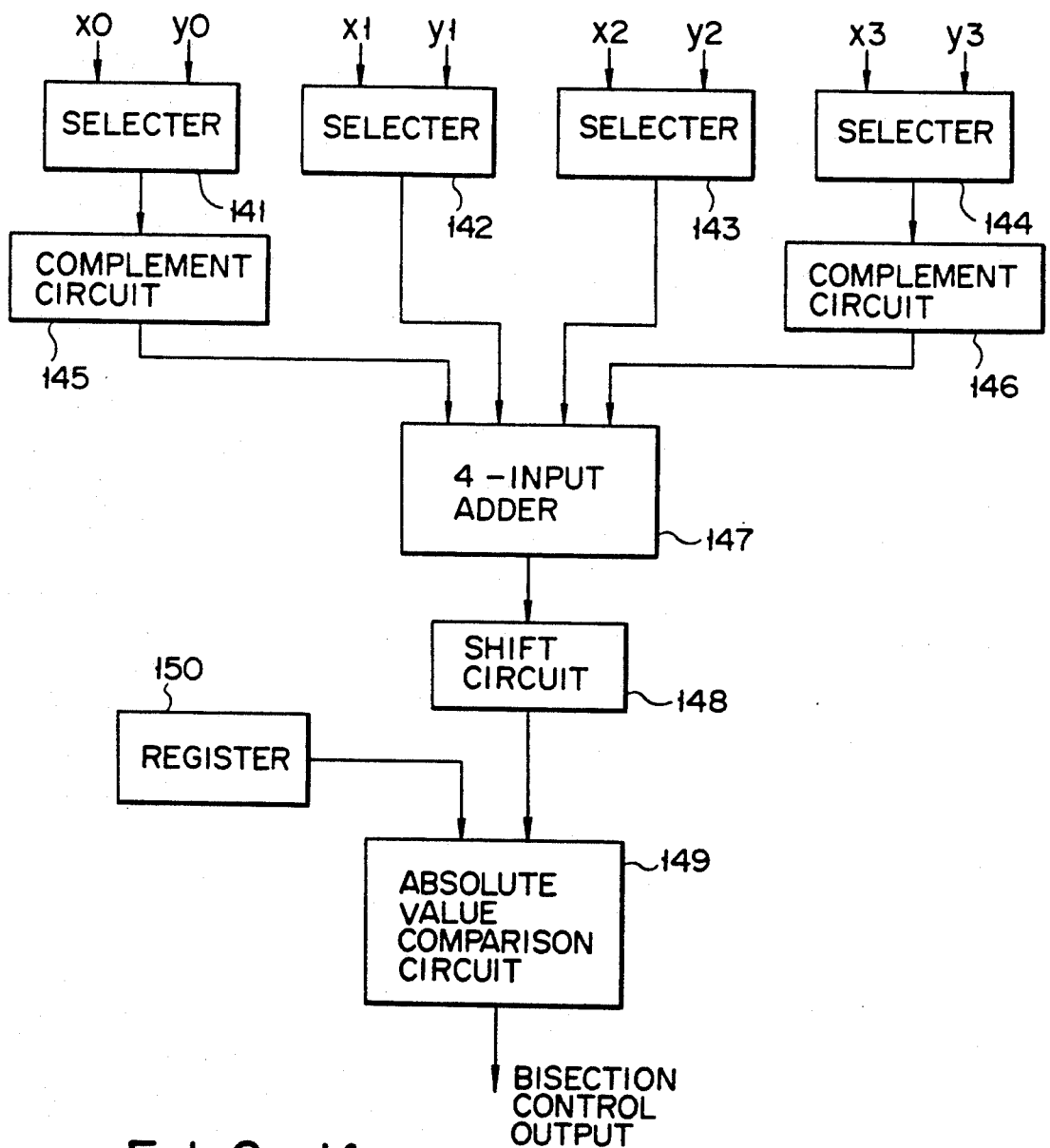
FIG. 14 is a circuit diagram showing an arrangement of the determining circuit used in the fourth embodiment of the present invention.

FIG. 14 is a block diagram showing an arrangement of a determination circuit used in the curve generator of the fourth embodiment. In this embodiment, x and y coordinates of four control points of a Bezier curve to be determined P0 (x0,y0), P1 (x1,y1), P2 (x2,y2), and P3 (x3,y3) are used to calculate values of $|\{(x1 + x2)/2\} − \{(x0 + x3)/2\}|$ and $|\{(y1 + y2)/2\} − \{(y0 + y3)/2\}|$, and the two values and the flatness are compared with each other to control the subdivision circuit. Referring to FIG. 14, four selectors 141 to 144 select the x or y coordinates of the four control points. Complement circuits 145 and 146 calculate complements of the outputs from the selectors 141 and 144, respectively. A 4-input adder 147 adds the outputs from the selectors 142 and 144 and the outputs from the complement circuits 145 and 146. A shifter 148 shifts the output from the adder 147 to the right by one bit to perform ½ processing for the addition result of the adder 147. An absolute value comparator 149 compares an output from the shifter 148 with the flatness e stored in a register 150 beforehand, and outputs a determination result. That is, in this determination circuit, the x and y coordinates of the control points are alternately selected by the four selectors 141 to 144 to alternately perform comparison between $|\{(x1 + x2)/2\} - \{(x0 + x3)/2\}|$ with the flatness e and comparison between $|\{(y1 + y2)/2\} - \{(y0 + y3)/2\}|$ and the flatness e.

If both of conditions for the x and y coordinates are established, i.e., if the following equations are established, the subdivision circuit is controlled not to perform subdivision:

$$\tfrac{1}{2} |(x1 + x2 - x0 - x3)| \leq e \qquad (6)$$

$$\tfrac{1}{2} |(y1 + y2 - y0 - y3)| \leq e \qquad (7)$$

By using such a determination circuit, a degree of approximation of the Bezier curve with respect to the straight line can be maintained constant to subdivide the Bezier curve into a plurality of straight lines.

As has been described above, according to the parameter curve generator of the present invention, a point on a Bezier curve or a curve generally represented by a polynomial of parameters can be generated at high speed every two clock cycles on the average. Therefore, the processing speed is significantly increased as compared with that of the conventional software processing. In addition, since no multiplier is used, the amount of hardware can be reduced and the processing speed can be increased as compared with the conventional method using multipliers. The amount of hardware can be further reduced by using a common subdivision circuit in different coordinate dimensions.

What is claimed is:

1. An apparatus for generating an arbitrary parameter curve represented as an n-th order Bezier curve, comprising:

register means for holding control point coordinate data of a Bezier curve as contents thereof;

determination circuit means for determining whether the Bezier curve is to be subdivided according to the control point coordinate data held by the register means;

subdivision circuit means for subdividing the Bezier curve represented by the control point coordinate data held in said register means by generating first and second sets of control point coordinate data representing two subdivided Bezier curves, wherein said subdivision circuit means comprises a plurality of tree-connected adders each including a plurality of serially-connected full adders and a plurality of carry selectors, said plurality of full adders being divided into a plurality of adder blocks to form a series of successive blocks including at least a lower block and a higher block, and each of said plurality of carry selectors is connected to a corresponding adder block, wherein propagation conditions of a carry supplied from the lower block are determined in the higher block, each said carry selector selects and outputs a carry supplied from the lower block or a carry generated by the higher block to a next higher block on the basis of the propagation conditions, and said carry selectors are arranged such that boundaries between said plurality of full adders coincide with a one bit shift between adjacent stages of the tree-connected adders;

stack memory means for storing the second set of control point coordinate data generated by the subdivision circuit means;

means for updating the contents of the register means with the first set of control point coordinate data from the subdivision circuit means or with a set of control point coordinate data popped out from the stack memory means responsive to the determination circuit means, wherein a subdivision operation is repeatedly performed by the subdivision circuit means to generate a series of end points of a plurality of subdivided Bezier curves, thereby approximating the desired parameter curve.

2. An apparatus for generating an arbitrary parameter curve represented as an n-th order Bezier curve, comprising:

register means for holding control point coordinate data of a Bezier curve as contents thereof;

determination circuit means for determining whether the Bezier curve is to be subdivided according to the control point coordinate data held by the register means;

subdivision circuit means for receiving a determination result from the determination circuit means and for subdividing the Bezier curve represented by the control point coordinate data held in said register means by generating first and second sets of control point coordinate data representing two subdivided Bezier curves on the basis of the determination result;

stack memory means for storing the second set of control point coordinate data generated by the subdivision circuit means; and means for updating the contents of the register means with the first set of control point coordinate data from the subdivision circuit means or with the second set of control point coordinate data popped out from the stack memory means, responsive to the determination circuit means, wherein a subdivision operation, a storing operation and an updating operation are repeatedly respectively performed by said subdivision circuit means, the stack memory means and the means for updating to generate a series of end points of a plurality of subdivided Bezier curves, thereby approximating a desired parameter curve, wherein said determination circuit means performs the determination such that the Bezier curve represented by the control point coordinate data in the register means is repeatedly subdivided until the parameter curve becomes two adjacent points having a unit distance on a bit map displaying the parameter curve, and wherein when said determination circuit means determines that a subdivided Bezier curve is subdivided into two adjacent points on a bit map, said determination circuit means outputs a difference representing a vector between a start point and an end point on the Bezier curve and terminates the subdivision operation, the storing operation and the updating operation.

3. An apparatus according to claim 2, wherein said determination circuit means performs determination such that said subdividing circuit means repeatedly subdivides the Bezier curve represented by the control point coordinate data into two parts until a maximum value of a distance between the Bezier curve and an approximate straight line representation of the Bezier curve becomes smaller than a predetermined value.

4. An apparatus according to claim 3, wherein said subdividing means performs subdivision repeatedly until a distance between a start point PO (XO, YO) and an end point PN (XN, YN) of the Bezier curve satisfies the following relationships:

$|XO\text{-}XN|$ < a unit distance (=1)

$|YO\text{-}YN|$ < a unit distance (=1).

5. An apparatus according to claim 2, wherein the Bezier curve is represented in a two-dimensional space having x and y coordinates, and said register means and said stack memory means include first and second registers and first and second stack memories for each of the x and y coordinates, respectively.

6. An apparatus according to claim 2, wherein the Bezier curve is represented in a two-dimensional space having x and y coordinates, and said subdividing circuit means includes first and second circuits for the x and y coordinates, respectively, which subdivide the Bezier curve, represented by the control coordinate data, in two parts alternately for the x and y coordinates.

7. An apparatus according to claim 2, wherein said subdivision circuit means comprises a plurality of adders and shifters for generating the first and second sets of control point coordinate data.

8. An apparatus according to claim 2, wherein said subdivision circuit means comprises a plurality of tree-connected adders each including a plurality of serially-connected full adders and a plurality of carry selectors, said plurality of full adders being divided into a plurality of adder blocks to form a series of successive blocks including at least a lower block and a higher block, and each of said plurality of carry selectors is connected to a corresponding adder block, wherein propagation conditions of a carry supplied from the lower block are determined in the higher block, each said carry selector selects and outputs a carry supplied from the lower block or a carry generated by the higher block to a next higher block on the basis of the propagation conditions, and said carry selectors are arranged such that boundaries between said plurality of full adders coincide with a one bit shift between adjacent stages of the tree-connected adders.

9. An apparatus according to claim 2, wherein when a distance between a subdivided control point of the Bezier curve and an approximate straight line representation thereof becomes smaller than a predetermined value, said determination circuit means controls said subdivision circuit means to stop subdivision processing of the Bezier curve represented by the control point coordinate data.

10. An apparatus according to claim 2, wherein the determination circuit means outputs the series of end points of the plurality of subdivided Bezier curves when the desired parameter curve has satisfactorily been approximated.

11. An apparatus according to claim 2, wherein the subdivision circuit means comprises N average circuits each comprising an adder and a shifter.

12. An apparatus according to claim 11, wherein the subdivision circuit means comprises n stages connected in series, each of said stages having an input and an output, an m-th stage (m<n) comprising n−m+1 average circuits, the input of a first stage being connected to the register means, and the output of an n-th stage being connected to the means for updating and to the determination circuit means.

13. An apparatus according to claim 2, wherein said determination circuit means outputs the series of end points of the subdivided Bezier curves when the Bezier curve is not to be further subdivided.

14. An apparatus according to claim 2, wherein said subdividing means performs subdivision repeatedly until a distance between a start point PO (XO, YO) and an end point PN (XN, YN) of the Bezier curve satisfies the following relationships:

$|XO-XN|$ < a unit distance (=1)

$|YO-YN|$ < a unit distance (=1).

15. An apparatus according to claim 2, wherein said determination circuit means outputs a difference between two adjacent points (XO−XN, YO−YN) representing a point of the arbitrary parameter curve to be generated and the determination circuit determines whether the difference between the two adjacent points satisfies the following relationships:

$|XO-XN|$ < a unit distance (=1)

$|YO-YN|$ < a unit distance (=1).

16. An apparatus according to claim 2, wherein the subdivision means comprises N (N is represented by n(n+1)/2) average circuits each comprising an adder and a shifter.

17. An apparatus according to claim 2, wherein the subdividing means comprises n stages connected in series, each stage having an input and an output, an m-th stage (m is an integer not greater than n) has n−m+1 average circuits, the input of a first stage being connected to the updating means and to the determination circuit means.

18. An apparatus according to claim 2, wherein:
the Bezier curve is represented by four control points, a first point P0(X0,Y0), a second point P1(X1, Y1), a third point P2(X2,Y2), and a fourth point P3(X3,Y3);
the distance between the Bezier curve and an approximate straight line is defined by a distance $|X4-X5|$, $|Y4-Y5|$ between a midpoint (Q2(X5,Y5)) of a straight line connecting the second and third points P1 and P2 and a midpoint (Q1(X4,Y4)) of a straight line connecting the first and fourth points P0 and P3, where coordinates X4, Y4, X5, and Y5 are represented by:

X4=(X0+X3)/2, Y4=(Y0+Y3)/2

X5=(X1+X2)/2, Y5=(Y1+Y2)/2;

the subdivision processing of the control points is stopped when the value $|X4-X5|$ becomes smaller than a predetermined value under a condition of $|X4-X5| > |Y4-Y5|$; and
the subdivision processing of the control point coordinate data is stopped when the value $|Y4-Y5|$ becomes smaller than a predetermined value under a condition of $|X4-X5| < |Y4-Y5|$.

* * * * *